United States Patent
Makino et al.

(10) Patent No.: US 8,847,443 B2
(45) Date of Patent: Sep. 30, 2014

(54) STATOR FOR A LINEAR MOTOR AND LINEAR MOTOR

(75) Inventors: Shogo Makino, Fukuoka (JP); Toru Shikayama, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 188 days.

(21) Appl. No.: 13/417,332

(22) Filed: Mar. 12, 2012

(65) Prior Publication Data
US 2013/0049488 A1  Feb. 28, 2013

(30) Foreign Application Priority Data
Aug. 23, 2011  (JP) .................................. 2011-181702

(51) Int. Cl.
*H02K 41/02*  (2006.01)
(52) U.S. Cl.
USPC ........................................................ 310/12.02
(58) Field of Classification Search
USPC ........................................... 310/12.01–12.33
See application file for complete search history.

(56) References Cited

U.S. PATENT DOCUMENTS

| | | | | |
|---|---|---|---|---|
| 5,300,846 A | * | 4/1994 | Miller | 310/12.27 |
| 6,433,446 B1 | * | 8/2002 | Sedgewick et al. | 310/12.21 |
| 7,888,827 B2 | * | 2/2011 | Kaneshige et al. | 310/12.21 |
| 2003/0137199 A1 | * | 7/2003 | Morel et al. | 310/12 |
| 2004/0217659 A1 | * | 11/2004 | Godkin | 310/12 |
| 2007/0170786 A1 | * | 7/2007 | Miyamoto et al. | 310/12 |

FOREIGN PATENT DOCUMENTS

| | | |
|---|---|---|
| CN | 1197225 C | 4/2005 |
| JP | 05-304761 | 11/1993 |
| JP | 2009-219199 | 9/2009 |
| JP | 2011-155757 | 8/2011 |

OTHER PUBLICATIONS

Japanese Office Action for corresponding JP Application No. 2011-181702, Jul. 16, 2013.
Chinese Office Action for corresponding CN Application No. 201210089366.1, Jul. 29, 2014.

* cited by examiner

*Primary Examiner* — Hanh Nguyen
(74) *Attorney, Agent, or Firm* — Mori & Ward, LLP

(57) ABSTRACT

A stator for a linear motor includes a yoke portion made of a soft magnetic material. The yoke portion includes an attachment portion to which a fastener for fixing the yoke portion to an installation target is attached. The yoke portion extends rectilinearly. The yoke portion further includes a plurality of salient poles protruding from the yoke portion. The salient poles are arranged at a specified interval along an extension direction of the yoke portion.

21 Claims, 6 Drawing Sheets

US 8,847,443 B2

STATOR FOR A LINEAR MOTOR AND LINEAR MOTOR

CROSS-REFERENCE TO RELATED APPLICATIONS

The present application claims priority under 35 U.S.C. §119 to Japanese Patent Application No. 2011-181702 filed on Aug. 23, 2011. The contents of this application are incorporated herein by reference in their entirety.

BACKGROUND OF THE INVENTION

1. Field of the Invention

Embodiments disclosed herein relate to a stator for a linear motor and a linear motor provided with the stator.

2. Description of the Related Art

As one example of electric motors, there is conventionally known a linear motor in which a mover is moved linearly along a stator. There are proposed linear motors in which permanent magnets are arranged at the side of a mover.

As an example, there is proposed a linear motor that includes: a mover having an armature with teeth wound with coils and a plurality of permanent magnets arranged in the armature; and a stator having salient poles formed on the surface thereof at a specified interval, the stator arranged in an opposing relationship with the mover (see, e.g., Japanese Patent Application Publication No. 2009-219199).

However, if the linear motor cited above has a structure in which the stator is joined to an installation plate by welding and the installation plate is fixed to an installation target by use of bolts, the installation plate becomes an obstacle in reducing the size of the linear motor.

SUMMARY OF THE INVENTION

In view of the above, embodiments disclosed herein provide a stator for a linear motor which assists in reducing the size of the linear motor and a linear motor provided with the stator.

In accordance with an aspect of the present invention, there is provided a stator for a linear motor, including: a yoke portion made of a soft magnetic material, the yoke portion including an attachment portion to which a fastener for fixing the yoke portion to an installation target is attached.

According to embodiments disclosed herein, it is possible to provide a stator for a linear motor which assists in reducing the size of the linear motor and a linear motor provided with the stator.

BRIEF DESCRIPTION OF THE DRAWINGS

The objects and features of the present invention will become apparent from the following description of embodiments, given in conjunction with the accompanying drawings, in which.

DESCRIPTION OF THE EMBODIMENTS

Embodiments of a stator for a linear motor and a linear motor provided with the stator will now be described in detail with reference to the accompanying drawings which form a part hereof. The present disclosure is not limited to the embodiments described herein below. For the sake of convenience in description, the positive side and the negative side along the X-axis in the respective drawings will be referred to as the "front side" and the "rear side" of a linear motor. The positive side and the negative side along the Y-axis in the respective drawings will be referred to as the "right side" and the "left side" of a linear motor. The positive side and the negative side along the Z-axis in the respective drawings will be referred to as the "upper side" and the "lower side" of a linear motor.

First Embodiment

Figure 1:
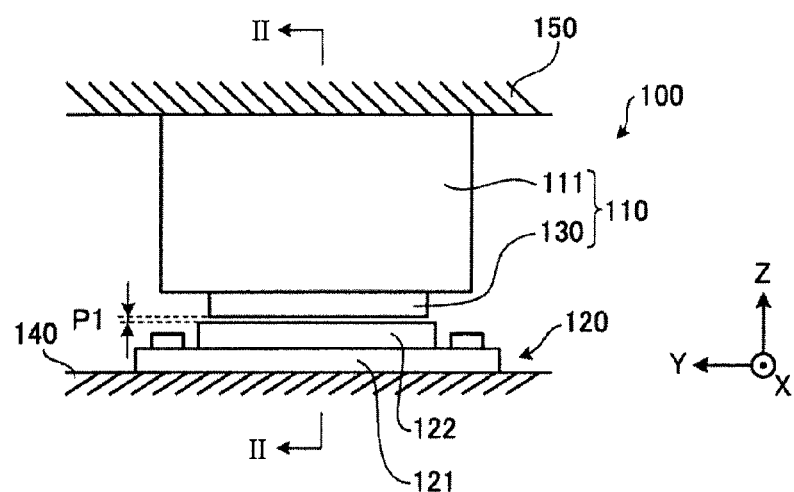
FIG. 1 is a schematic front view showing a linear motor according to a first embodiment.
Figure 2:
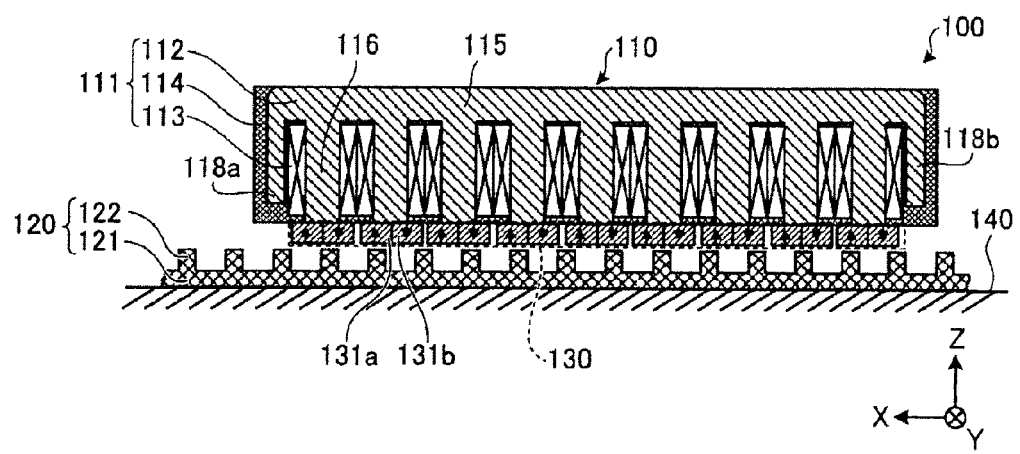
FIG. 2 is a schematic side section view of the linear motor taken along line II-II in FIG. 1.

First, description will be made on the configuration of a linear motor according to a first embodiment. FIG. 1 is a schematic front view showing a linear motor according to a first embodiment. FIG. 2 is a schematic side section view of the linear motor according to the first embodiment, which is taken along line II-II in FIG. 1.

Referring to FIG. 1, the linear motor 100 according to the first embodiment includes a mover 110 and a stator 120, both of which extend in the front-rear direction (the X-axis direction in the present embodiment). The linear motor 100 is installed on an installation target 140. The mover 110 is opposed to the stator 120 with a gap P1 left therebetween in the up-down direction and is guided and supported by linear movement bearings (not shown) so that the mover 110 can move in the front-rear direction with respect to the stator 120. A moving object 150 to be moved in the front-rear direction by the linear motor 100 is attached to the upper portion of the mover 110.

In the linear motor 100, the mover 110 includes an armature 111 and a main-pole magnet array 130 and generates progressive magnetic fields. By virtue of the thrust force generated between the progressive magnetic fields and the salient poles 122 of the stator 120, the mover 110 is moved in the front-rear direction with respect to the stator 120. In the following description, the moving direction of the mover 110, i.e., the front-rear direction will be referred to as "stroke direction".

As shown in FIG. 2, the mover 110 includes an armature core 112, a plurality of coils 113 and a main-pole magnet array 130. The armature core 112 is formed of a soft magnetic material, e.g., laminated silicon steel plates or a SMC (Soft Magnetic Composite) core. The armature core 112 includes a yoke portion 115, the longitudinal direction of which extends in the stroke direction, and a plurality of teeth 116 extending downward from the yoke portion 115.

The teeth 116 are formed into a rectilinear shape extending in the left-right direction and are arranged at a specified interval along the stroke direction. The coils 113 as three-phase armature windings are wound around the respective teeth 116 through insulation materials in the form of concentrated windings. Each of the coils 113 is formed of an insulating sheath wire, e.g., a copper wire.

The armature core 112 includes, e.g., nine teeth 116, which are divided into, e.g., first, second and third groups in the named order from the front side. Each of the groups includes three teeth 116 continuously arranged in the stroke direction. U-phase coils 113, V-phase coils 113 and W-phase coils 113 are respectively wound around the teeth 116 of the first, second and third groups in the form of concentrated windings.

Auxiliary teeth 118a and 118b protruding downward from the yoke portion 115 are formed at the stroke-direction opposite ends of the armature core 112. The auxiliary teeth 118a and 118b help restrain the cogging which may become a major culprit of thrust force variation.

In a state that the coils 113 are wound around the teeth 116, the armature core 112 as a whole is molded with a molding resin 114. The tip ends of the teeth 116 of the armature 111 are formed into a flat shape. The main-pole magnet array 130 for generating a thrust force is fixed to the tip ends of the teeth 116 of the armature 111 by an adhesive agent or the like.

The main-pole magnet array 130 includes main-pole magnets 131a and 131b differing in polarity from each other, which are alternately arranged along the arranging direction of the teeth 116. Each of the main-pole magnets 131a and 131b is formed into a substantially rectangular parallelepiped shape, the longitudinal direction of which extends in the left-right direction. The main-pole magnets 131a and 131b are magnetized in the directions indicated by arrows. In other words, the main-pole magnets 131a are permanent magnets, each of which has a lower N-pole and an upper S-pole. The main-pole magnets 131b are permanent magnets, each of which has an upper N-pole and a lower S-pole. The main-pole magnets 131a and 131b are not limited to the permanent magnets but may be, e.g., electromagnets.

Next, description will be made on the configuration of the stator 120. As shown in FIG. 2, the stator 120 is a salient pole member including a yoke portion 121 rectilinearly extending in the front-rear direction and a plurality of salient poles 122 arranged at a specified interval along the front-rear direction. The stator 120 is formed of a soft magnetic material such as laminated silicon steel plates, an SMC core, a 3%-Si iron or an iron-made structural member.

The yoke portion 121 is formed into a substantially rectangular parallelepiped shape, the longitudinal direction of which extends in the front-rear direction. The longitudinal direction of the salient poles 122 extends in the left-right direction. The salient poles 122 protrude upward from the yoke portion 121. The salient poles 122 of the stator 120 are provided to generate a thrust force between themselves and the magnetic fields generated by the mover 110. In the example shown in FIG. 2, the mover 110 is moved in the front-rear direction with respect to the stator 120 by virtue of the thrust force. More specifically, the magnetic flux of the coils 113 of the armature 111 overlaps with the magnetic flux of the main-pole magnets 131a and 131b making up the main-pole magnet array 130, thereby generating thirteen-pole progressive magnetic fields. A thrust force is generated between the thirteen-pole progressive magnetic fields and the thirteen salient poles 122. By virtue of the thrust force, the mover 110 is moved in the front-rear direction with respect to the stator 120.

Figure 3:
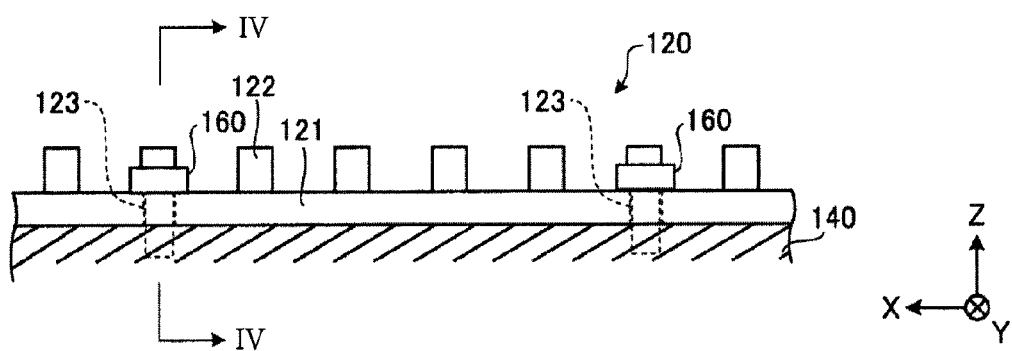
FIG. 3 is a schematic side view showing a stator according to a first embodiment.
Figure 4:
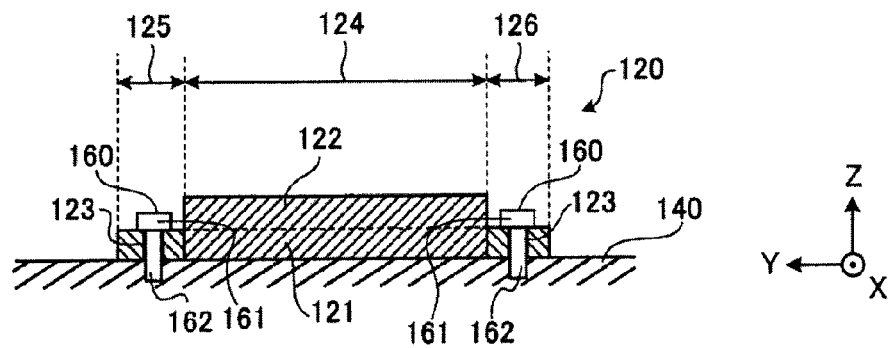
FIG. 4 is a schematic section view of the stator taken along line IV-IV in FIG. 3.
Figure 5A:
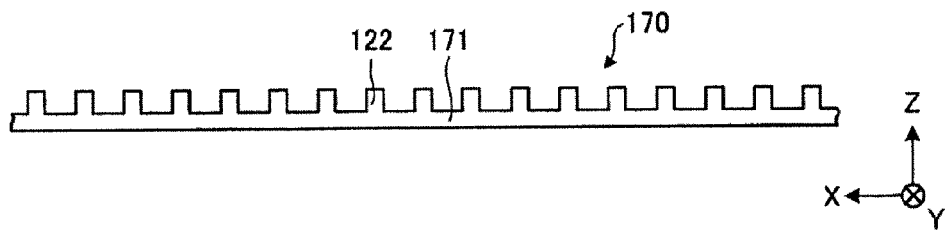
FIG. 5A is an explanatory view showing a member that makes up the stator according to the first embodiment.
Figure 5B:
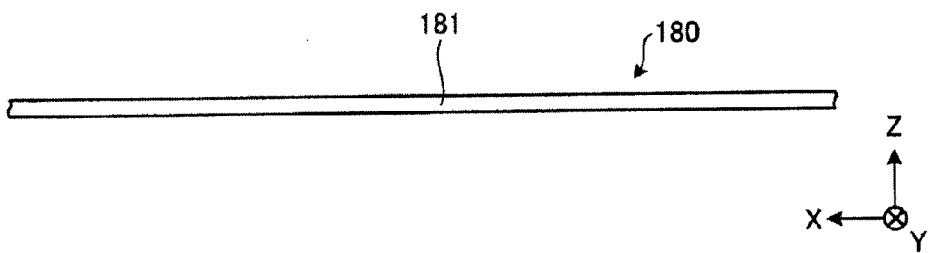
FIG. 5B is an explanatory view showing another member that makes up the stator according to the first embodiment.

In the linear motor 100 according to the first embodiment, for the sake of reducing the size of the linear motor 100, the yoke portion 121 is provided with an attachment portion to which a fastener for fixing the yoke portion 121 to the installation target 140 is attached. The attachment portion will now be described with respect to FIGS. 3, 4, 5A and 5B. FIG. 3 is a schematic side view showing the stator 120. FIG. 4 is a schematic section view of the stator 120 taken along line IV-IV in FIG. 3. FIGS. 5A and 5B are explanatory views showing a member that makes up the stator 120.

Referring to FIG. 3, non-threaded through-holes 123 as attachment portions, through which bolts 160 as fasteners are attached, are formed in the yoke portion 121 of the stator 120 at a specified interval along the front-rear direction. The through-holes 123 are formed in the regions of the yoke portion 121 where the salient poles 122 are not arranged. The yoke portion 121 is greater in width than the salient poles 122. In other words, as shown in FIG. 4, the through-holes 123 are not formed in a salient-pole forming region (or a first yoke portion) 124 including salient pole regions and inter-salient-pole regions but are formed in yoke regions (or second yoke portions) 125 and 126 existing at the left and right sides of the salient-pole forming region 124.

When the stator 120 is installed on the installation target 140, the bolts 160 are inserted through the respective through-holes 123 as shown in FIGS. 3 and 4. Threaded bolt holes are formed in the installation target 140. Thus the shaft portions 162 of the bolts 160 are fixed to the installation target 140 with the head portions 161 of the bolts 160 pressed against the upper surface of the yoke portion 121. In the following description, the bolt holes are intended to mean threaded bolt holes.

In place of the bolt holes to which the shaft portions 162 of the bolts 160 are threadedly coupled, non-threaded through-holes may be formed in the installation target 140. Nuts are tightened to the shaft portions 162 of the bolts 160 exposed from the non-threaded through-holes. As a result, the bolts 160 can be fastened to the installation target 140.

In the instance stated just above, threaded bolt holes may be used in place of the through-holes 123 as attachment portions formed in the yoke portion 121. In this case, the bolts 160 are threadedly coupled to the bolt holes. This makes it possible to more strongly fix the stator 120 to the installation target 140. As the fasteners, nails or the like may be used in place of the bolts 160.

The stator 120 may be made up of, e.g., three core members, namely a first core member defining the salient-pole forming region 124, a second core member defining the yoke region 125 and a third core member defining the yoke region 126. In this case, the stator 120 is formed by, e.g., arranging the second and third core members in contact with the right and left surfaces of the first core member.

As the first core member defining the salient-pole forming region 124, it may be possible to use a core member 170 shown in FIG. 5A, which includes a yoke portion 171 rectilinearly extending in the front-rear direction and a plurality of salient poles 122 protruding upward from the yoke portion 171.

As the second and third core members defining the yoke regions 125 and 126, it may be possible to use core members 180 shown in FIG. 5B, each of which includes a yoke portion 181 rectilinearly extending in the front-rear direction. In the present embodiment, the up-down height of the yoke portion 171 is set equal to the up-down height of the yoke portion 181.

The core members 170 and 180 are formed of a soft magnetic material such as laminated silicon steel plates, an SMC core, a 3%-Si iron or an iron-made structural member. If the core members 170 and 180 are formed by stacking a plurality of thin electromagnetic steel plates such as laminated silicon steel plates in the left-right direction, it is possible to reduce an eddy current and to enhance the characteristics of the linear motor 100. By setting the left-right width of the salient poles 122 equal to the left-right width of the yoke portion 171, it becomes possible to form the core member 170 from electromagnetic steel plates.

In the linear motor 100 according to the first embodiment, as set forth above, the through-holes 123 are formed in the yoke portion 121 having a width greater than the width of the salient poles 122. The bolts 160 are directly inserted through the through-holes 123 to fix the stator 120 in place. This makes it possible to reduce the size of the linear motor.

In case of, e.g., a structure in which a stator is joined to an installation plate by welding and the installation plate is fixed to an installation target by bolts, the installation plate becomes an obstacle in reducing the size of a linear motor. In the linear motor 100 according to the present embodiment, however, the yoke portion 121 can be directly fixed to the installation target. Thus the installation plate becomes unnecessary, which makes it possible to reduce the size of the linear motor.

In addition, the yoke portion 121 is formed of the yoke portion 171 having a plurality of salient poles 122 and the yoke portions 181 making contact with the side surfaces of the yoke portion 171. The through-holes 123 as attachment portions are formed in the yoke portions 181. The bolts 160 are not fastened to the salient-pole forming region 124. Accordingly, even if the bolts 160 are made of, e.g., a magnetic material, it is possible to restrain the bolts 160 from affecting the progressive magnetic fields generated by the mover 110.

While the through-holes 123 as attachment portions are formed in the yoke portion 121 in the example described above, the present disclosure is not limited thereto but may be modified in many different forms.

Figure 6:
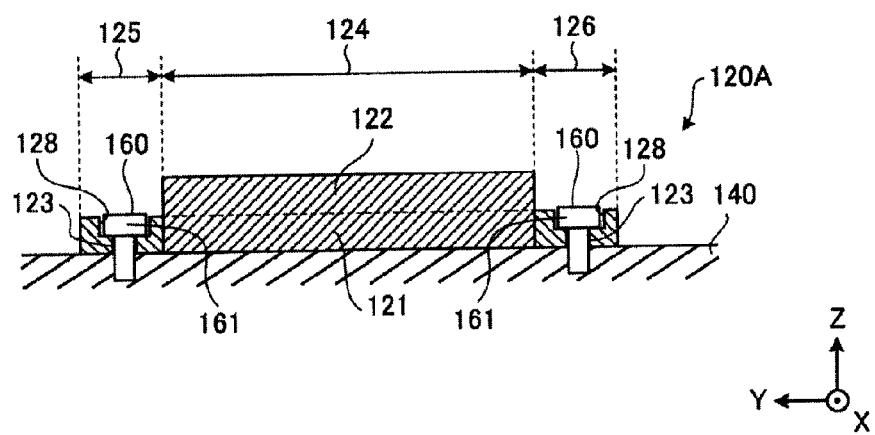
FIG. 6 is a schematic section view showing another stator according to the first embodiment.

For example, it may be possible to employ a stator 120A shown in FIG. 6. FIG. 6 is a schematic section view showing another stator according to a modified example of the first embodiment. In the stator 120A shown in FIG. 6, recess portions 128 are formed in the yoke regions 125 and 126 of the yoke portion 121. Through-holes 123 are formed in the recess portions 128.

As a result, the head portions 161 of the bolts 160 are partially or wholly received within the recess portions 128, which makes it possible to lower the positions of the head portions 161 of the bolts 160. Accordingly, even if the bolts 160 are made of, e.g., a magnetic material, it is possible to restrain the bolts 160 from affecting the progressive magnetic fields generated by the mover 110.

Figure 7A:
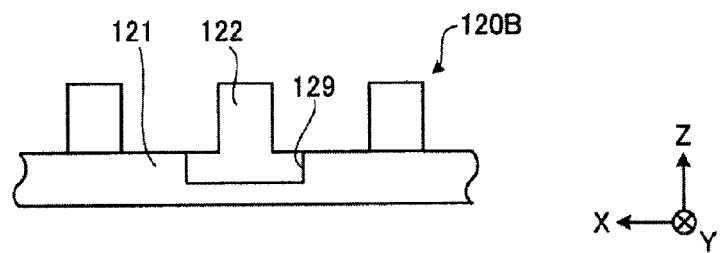
FIG. 7A is a schematic side view showing a further stator according to the first embodiment.
Figure 7B:
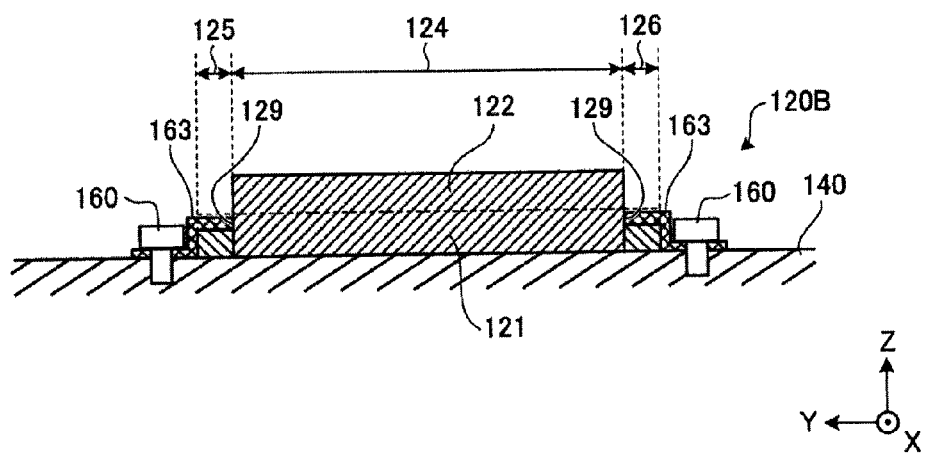
FIG. 7B is a schematic section view of the stator shown in FIG. 7A.

Moreover, it may be possible to employ a stator 120B shown in FIG. 7A. FIG. 7A is a schematic side view showing a further stator according to another modified example of the first embodiment. FIG. 7B is a schematic section view of the stator shown in FIG. 7A. In the stator 120B shown in FIGS. 7A and 7B, recess portions 129 extending toward the opposite ends of the yoke portion 121 are formed in the yoke regions 125 and 126 of the yoke portion 121. The tip ends of bracket members 163 are fitted to the recess portions 129. The base ends of the bracket members 163 are fixed to the installation target 140 by the bolts 160. Thus the stator 120B is installed on the installation target 140. In other words, the bolts 160 and the bracket members 163 are used as fasteners to install the stator 120B on the installation target 140. In this regard, the recess portions 129 serve as attachment portions to which fasteners are attached.

The tip ends of the bracket members 163 are arranged within the recess portions 129. Accordingly, even if the bracket members 163 are made of, e.g., a magnetic material, it is possible to restrain the bracket members 163 from affecting the progressive magnetic fields generated by the mover 110. While each of the bracket members 163 has such a shape that an L-like plate member is formed at the tip end of straight plate member having a through-hole for passage of each of the bolts 160. The shape of the bracket members 163 is not limited thereto.

Second Embodiment

Figure 8:
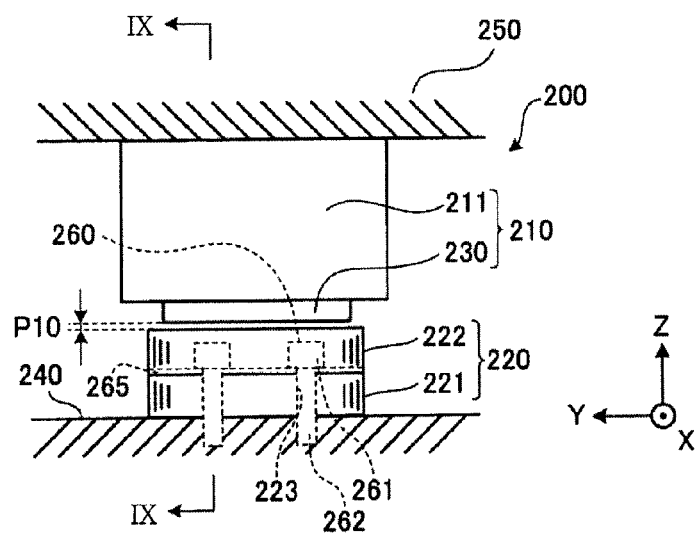
FIG. 8 is a schematic front view showing a linear motor according to a second embodiment.
Figure 9:
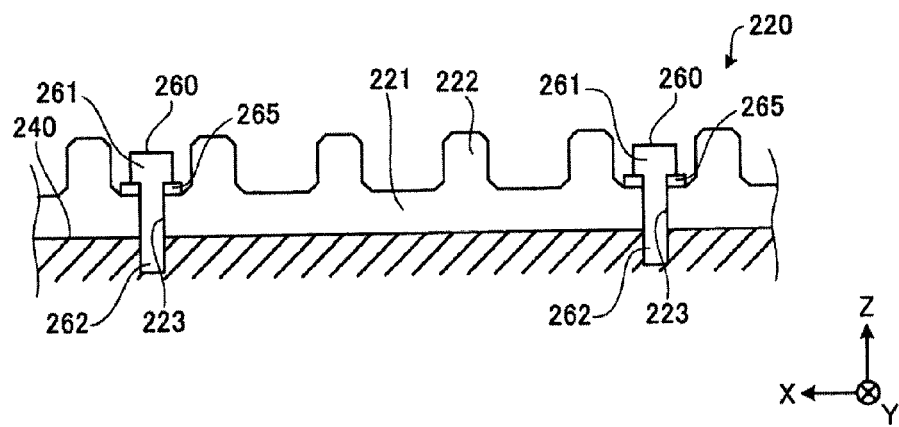
FIG. 9 is a schematic section view of the linear motor taken along line IX-IX in FIG. 8.

Description will now be made on the configuration of a stator according to a second embodiment. FIG. 8 is a schematic front view showing a linear motor according to a second embodiment. FIG. 9 is a schematic side section view of the linear motor taken along line IX-IX in FIG. 8. For the sake of convenience in description, the points differing from the linear motor 100 of the first embodiment will be primarily described with any repeated description omitted.

Referring to FIG. 8, the linear motor 200 according to the second embodiment includes a mover 210 and a stator 220, both of which extend in the front-rear direction. The linear motor 200 is installed on an installation target 240. The mover 210 is opposed to the stator 220 with a gap P10 left therebetween in the up-down direction and is guided and supported by linear movement bearings (not shown) so that the mover 210 can move in the front-rear direction with respect to the stator 220.

In the linear motor 200, just like the linear motor 100, the mover 210 includes an armature 211 and a main-pole magnet array 230 and generates progressive magnetic fields. By virtue of the thrust force generated between the progressive magnetic fields and the salient poles 222 of the stator 220, the mover 210 is moved in the front-rear direction with respect to the stator 220. The mover 210 has the same configuration as that of the mover 110 of the first embodiment.

As shown in FIG. 9, the stator 220 is a salient pole member including a yoke portion 221 and a plurality of salient poles 222. The yoke portion 221 is formed into a substantially rectangular parallelepiped shape, the longitudinal direction of which extends in the front-rear direction. The salient poles 222 are formed to protrude upward from the yoke portion 221. The longitudinal direction of the salient poles 222 extends in the left-right direction. The salient poles 222 are arranged at a specified interval along the front-rear direction.

In the stator 220 shown in FIG. 8, the yoke portion 221 and the salient poles 222 have the same width along the left-right direction. As shown in FIG. 9, through-holes 223 as attachment portions, though which bolts 260 as fasteners are inserted, are formed in the regions of the yoke portion 221 between the salient poles 222 at a specified interval along the front-rear direction.

When the stator 220 is installed on the installation target 240, the bolts 260 are inserted through the respective through-holes 223 as shown in FIGS. 8 and 9. Bolt holes are formed in the installation target 240. As a result, the shaft portions 262 of the bolts 260 are fixed to the installation target 240 in a state that the head portions 261 of the bolts 260 are pressed against the upper surface of the yoke portion 221 through holes of pressing plates 265. Each of the pressing plates 265 is formed to make contact with substantially the entire regions of the yoke portion 221 between the salient poles 222. Thus the entire regions of the yoke portion 221 between the salient poles 222 are pressed by the pressing plates 265. This makes it possible to more accurately fix the stator 220 to the installation target 240.

In this regard, it is preferred that the bolts 260 be made of a non-magnetic material such as an austenitic stainless steel or the like. This makes it possible to restrain the bolts 260 from affecting the progressive magnetic fields generated by the mover 210. If the pressing plates 265 are made of a non-magnetic material such as an austenitic stainless steel or the like, it is possible to further restrain the bolts 260 from affecting the progressive magnetic fields.

The tip end portions of the salient poles 222 have a substantially arc-like shape when seen in a cross-sectional view. This makes it possible to easily insert the bolts 260 and the pressing plates 265 into between the salient poles 222 when attaching the bolts 260 and the pressing plates 265.

In place of the bolt holes to which the shaft portions 262 of the bolts 260 are threadedly coupled, non-threaded through-holes may be formed in the installation target 240. Nuts are tightened to the shaft portions 262 of the bolts 260 exposed from the non-threaded through-holes. As a result, the bolts 260 can be fastened to the installation target 240. In this case, threaded bolt holes may be used in place of the through-holes 223 as attachment portions formed in the yoke portion 221. In this case, the bolts 260 are threadedly coupled to the bolt holes. This makes it possible to more strongly fix the stator 220 to the installation target 240. As the fasteners, nails or the like may be used in place of the bolts 260.

In the linear motor 200 according to the second embodiment, as set forth above, the through-holes 223 as attachment portions are formed in the regions of the yoke portion 221 between the salient poles 222. The bolts 260 are directly inserted through the through-holes 223 to fix the stator 220 in place. Accordingly, as compared with the stator 120 of the first embodiment, it is possible to reduce the left-right width of the stator 220, which assists in reducing the size of the linear motor.

While the head portions 261 of the bolts 260 are pressed against the upper surface of the yoke portion 221 through the holes of the pressing plates 265, the present disclosure is not limited thereto but may be modified in many different forms.

Figure 10:
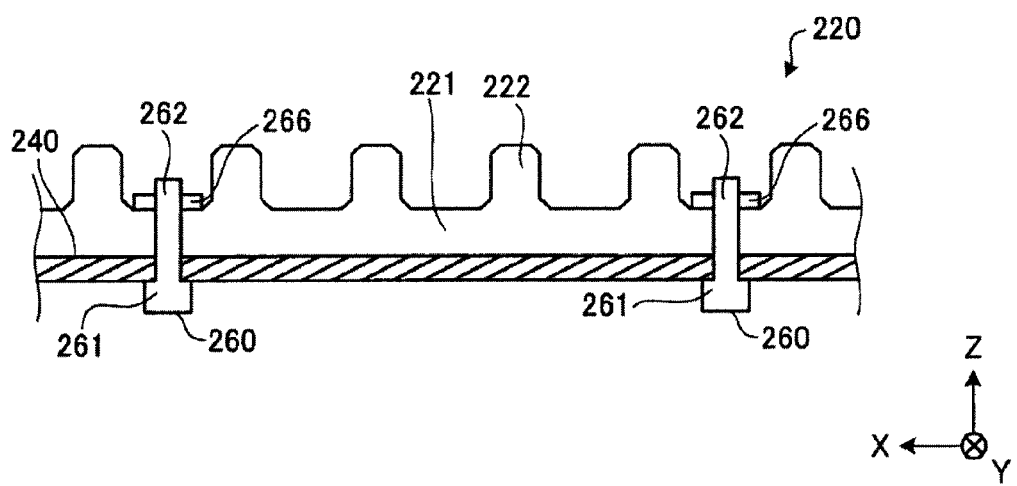
FIG. 10 is a schematic section view showing a stator according to a second embodiment.

For example, as shown in FIG. 10, the shaft portions 262 of the bolts 260 may be caused to protrude toward the side of the yoke portion 221 at which the salient poles 222 exist. Pressing plates 266 each having a bolt hole may be attached to the shaft portions 262 of the bolts 260 by rotating the bolts 260. Thus the yoke portion 221 can be fixed to the installation target 240. In this case, it is preferred that the pressing plates 266 be made of a non-magnetic material such as an austenitic stainless steel or the like. This makes it possible to restrain the pressing plates 266 from affecting the progressive magnetic fields generated by the mover 210. In place of the pressing plates 266, nuts may be attached to the shaft portions 262 of the bolts 260.

While the preferred embodiments of the present disclosure have been described above, the present disclosure is not limited to these specific embodiments but may be modified or changed in many different forms without departing from the scope of the invention defined in the claims. Such modifications or changes shall be construed to fall within the scope of the invention.

What is claimed is:

1. A stator for a linear motor, comprising:
   a yoke portion made of a soft magnetic material and extending rectilinearly in a yoke extension direction, the yoke portion including an attachment portion to which a fastener for fixing the yoke portion to an installation target is attached; and
   a plurality of salient poles protruding from the yoke portion, the salient poles being arranged at a specified interval along the yoke extension direction and extending in a pole extension direction normal to the yoke extension direction,
   wherein the attachment portion is disposed in a region of the yoke portion between two neighboring salient pole extension and a width of the yoke portion in the pole extension direction is substantially identical to a width of each of the salient poles in the pole extension direction.

2. The stator of claim 1, wherein the fastener is made of a non-magnetic material.

3. The stator of claim 1, wherein the attachment portion includes a through-hole through which the fastener is inserted.

4. The stator of claim 1, wherein the fastener is a bolt with a shaft portion and the yoke portion is fixed to the installation target by causing the shaft portion of the bolt to protrude toward a side of the yoke portion at which the salient poles are arranged and attaching a pressing plate or a nut to the shaft portion of the bolt.

5. The stator of claim 4, wherein the pressing plate is configured to make contact with a substantially entire region of the yoke portion between the two neighboring salient poles.

6. The stator of claim 4, wherein the pressing plate is made of a non-magnetic material.

7. A linear motor comprising the stator of claim 1.

8. The linear motor of claim 7, wherein the fastener is a bolt with a shaft portion and the yoke portion is fixed to the installation target by causing the shaft portion of the bolt to protrude toward a side of the yoke portion at which salient poles are arranged and attaching a pressing plate or a nut to the shaft portion of the bolt.

9. The stator of claim 1, wherein each of the salient poles has a base end portion whose width increases toward the yoke portion.

10. The stator of claim 1, wherein each of the salient poles has a tip end portion which is generally arc-shaped when seen in the pole extension direction.

11. A stator for a linear motor, comprising:
    a yoke portion made of a soft magnetic material and extending rectilinearly in an yoke extension direction, the yoke portion including an attachment portion to which a fastener for fixing the yoke portion to an installation target is attached; and
    a plurality of salient poles protruding from the yoke portion, the salient poles being arranged at a specified interval along the yoke extension direction and extending in a pole extension direction normal to the yoke extension direction,
    wherein the salient poles have two opposite ends along the pole extension direction and the attachment portion is disposed between the two opposite ends when seen in the yoke extension direction.

12. The stator of claim 11, wherein the fastener is made of a non-magnetic material.

13. The stator of claim 11, wherein the attachment portion includes a through-hole through which the fastener is inserted.

14. The stator of claim 11, wherein the fastener is a bolt with a shaft portion and the yoke portion is fixed to the installation target by causing the shaft portion of the bolt to protrude toward a side of the yoke portion at which the salient poles are arranged and attaching a pressing plate or a nut to the shaft portion of the bolt.

15. The stator of claim 14, wherein the pressing plate is configured to make contact with a substantially entire region of the yoke portion between the two neighboring salient poles.

16. The stator of claim 14, wherein the pressing plate is made of a non-magnetic material.

17. The stator of claim 11, wherein each of the salient poles has a base end portion whose width increases toward the yoke portion.

18. The stator of claim 11, wherein each of the salient poles has a tip end portion which is generally arc-shaped when seen in the pole extension direction.

19. A linear motor comprising the stator of claim 11.

20. The linear motor of claim 19, wherein the fastener is a bolt with a shaft portion and the yoke portion is fixed to the installation target by causing the shaft portion of the bolt to protrude toward a side of the yoke portion at which the salient poles are arranged and attaching a pressing plate or a nut to the shaft portion of the bolt.

21. The stator of claim 1,
wherein the plurality of salient poles protrude from the yoke portion in a protruding direction that is normal to the yoke extension direction,
wherein the pole extension direction is normal to both the yoke extension direction and the protruding direction, and
wherein the attachment portion is disposed in the region of the yoke portion at a location sandwiched between the two neighboring salient poles.

* * * * *